Patented Apr. 23, 1946

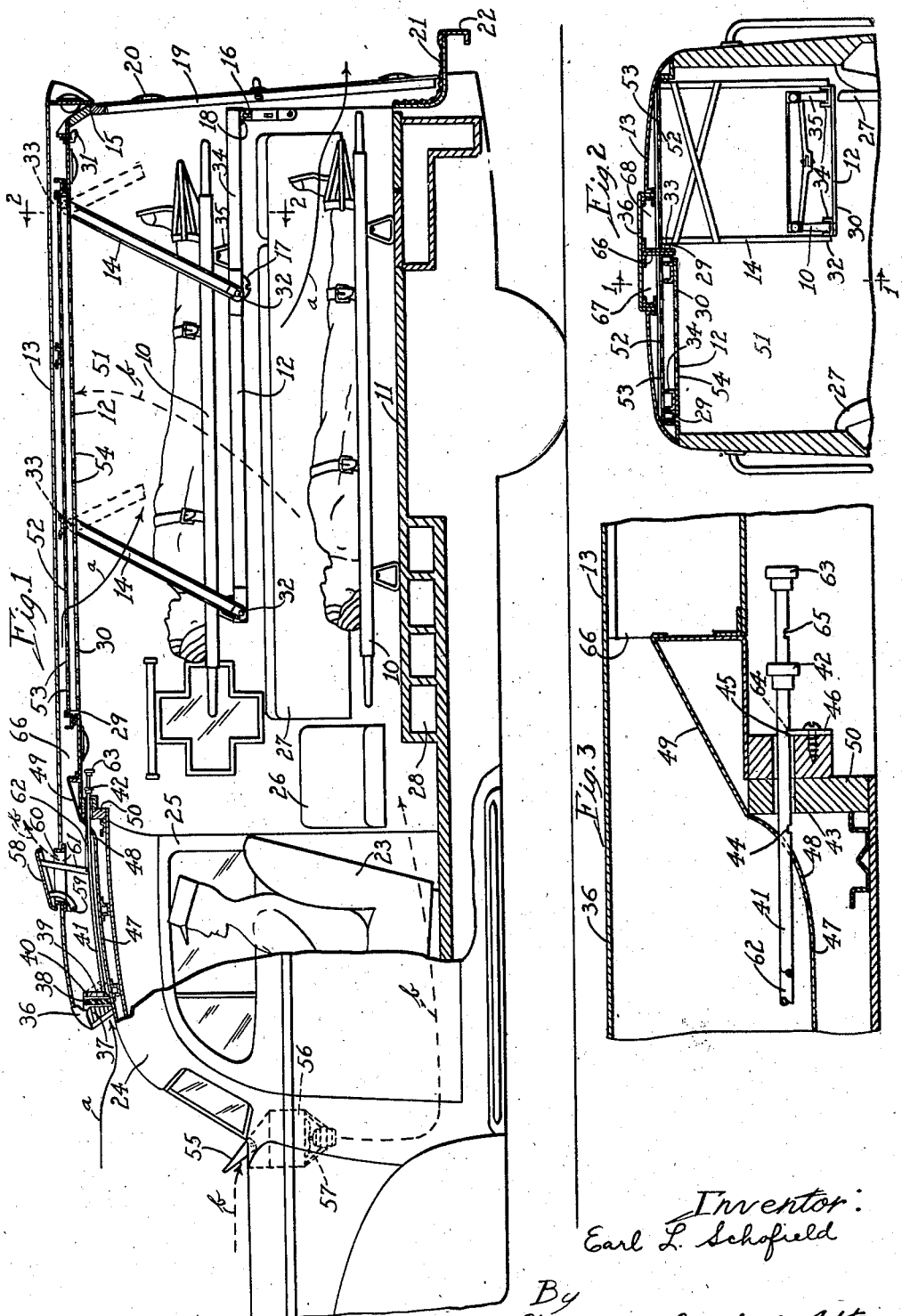

2,398,894

UNITED STATES PATENT OFFICE 2,398,894

AMBULANCE VENTILATION SYSTEM

Earl L. Schofield, Auburn, Ind., assignor to Henney Motor Company, Freeport, Ill., a corporation of Delaware Application February 27, 1943, Serial No. 477,471

3 Claims. (Cl. 98—2)

This application is a continuation in part of my copending application Serial No. 426,985, filed January 16, 1942.

This invention relates to a new and improved ventilation system especially designed and adapted for use in an ambulance, but also suitable for other vehicles.

The principal object of my invention is to provide a system whereby fresh air in warm weather may be introduced from a full length air duct in the top of the vehicle having a fresh air intake at the forward end forming a scoop-like projection above the cab portion, the fresh air discharging downwardly from the duct through openings distributed lengthwise of the bottom of the duct and being discharged under, around, and between the rear doors of the vehicle, a shut off valve being provided for the fresh air intake, to be closed in cold weather, and a ventilator being provided in the top wall of the air duct arranged to be opened in cold weather inclined in such relation to the movement of the vehicle so that foul air will be exhausted from the aforesaid air duct, the foul air being collected through the aforesaid openings distributed lengthwise of the bottom of the air duct, fresh air under these operating conditions being taken in through a cowl ventilator and heated at or near the point of intake.

Another object of the invention is to provide stretcher carriers suspended from the top of the ambulance on pivoted arms swingable as a pendulum relative to the top for movement of the carriers from an extended loading and unloading position to a retracted position for transportation, and movable, furthermore, with the arms upwardly to an out-of-the-way position in a recess in the top under the full length air duct, the carriers having bottoms provided with openings distributed lengthwise thereof through which air may pass freely when the carriers are disposed in the folded out-of-the-way position, whereby to permit substantially as good ventilation under those conditions as otherwise, this being particularly important in an ambulance for civilian defense use, because when the ambulance is not being used for taking injured to the hospitals, it is used in the evacuation of children and old people from areas under bombardment and is equipped for that purpose with full length seats on opposite sides of the body, foldable to out-of-the-way positions along the side walls.

The invention is illustrated in the accompanying drawing, in which—

Fig. 1 is a vertical longitudinal section through an ambulance embodying my invention, the section being taken on the line 1—1 of Fig. 2;

Fig. 2 is a cross-section of Fig. 1, taken on the line 2—2 thereof, and

Fig. 3 is an enlarged sectional detail of a portion of Fig. 1.

The same reference numerals are applied to corresponding parts throughout these views.

The ambulance shown in Figs. 1 and 2, as disclosed in the parent application, is adapted to support two standard Red Cross or Army type stretchers 10 side by side on the floor 11. Two other stretchers 10 can be supported on carrier racks 12, referred to hereinafter as carriers, suspended from the top 13 on pendulum type arms 14. These arms are swingable from the full line position for transportation of the stretchers to the dotted line position indicated in Fig. 1 to have the carriers 12 project through the rear door opening far enough for easy loading and unloading of the stretchers carried thereby. The arms 14 are long enough to provide not only for sufficient extension of the two carriers 12 from the rear of the ambulance in the loading position, but also for support of the carriers at an elevation low enough for easy loading of patients by inexperienced average size men and women standing behind the ambulance. A latch is indicated at 16 and is provided in connection with each carrier in the rear end of the body to cooperate with locking plates 17 and 18 for quickly releasably locking the carrier in either of the two positions mentioned. After a stretcher has been loaded on one of the carriers 12, the latch 16 for that carrier can be released and the carrier will tend to swing inwardly by gravity, due to the pendulum type levers 14. It, therefore, takes very little effort on the part of the attendant to operate the carrier, and it should be clear that the stretcher 10 in this movement of the carrier remains horizontal, which according to medical authorities is most important in the handling of the sick and injured, and it should also be clear that there is no necessity for the attendant entering the ambulance in the loading or unloading. Any one of the four patients in a fully loaded ambulance can be removed without disturbing any of the others and without requiring an attendant to enter the ambulance. There are two doors 19, hinged as at 20, to close the rear end of the ambulance, and there is a rear step 21 which is more or less covered and protected by the doors 19 when closed. This is a convenient entry step, the tread portion of which is level with the top of the rear bumper 22.

In addition to the driver's seat 23 in the front cab portion 24, there is another front seat along side it (not shown), which is movable to an out-of-the-way position to permit attendants to enter or leave the ambulance through the right hand front door 25. Two seats 26 on opposite sides of the ambulance behind the front seats are for nurses or attendants when the ambulance is being used for carrying sick and injured. There are two full length seats 27 behind the attendants' seats 26, which can be swung down from the sides of the ambulance and made available for use when the ambulance is to be used, for example, in the evacuation of children and old people from areas under bombardment. The stretchers 10 under those conditions are stored in the compartments 28 under the floor 11 extending crosswise relative to the body of the ambulance. The carriers 12, or either of them, can be moved upwardly into recesses 29 provided therefor in the top 13, as indicated in the left hand portion of Fig. 2; the pendulum type arms 14 being foldable upwardly into the recesses 29 with the carriers 12, and when the carriers are moved to this out-of-the-way position, the bottoms 30 thereof are substantially flush with the inside of the top, as should be clear from Figs. 1 and 2. Suitable latch means (not shown) are provided operable by means of the thumb-piece 31 to lock the carriers releasably in the out-of-the-way position. The carriers are pivoted to the lower ends of the arms 14 at 32, and the arms are pivoted in the top of the ambulance at 33, and suitable spring means (not shown) are provided for counterbalancing the weight of the carrier assemblies, so that when the latches 31 are released the carriers will not drop freely by gravity but can be moved downwardly easily to the operating position. On the other hand, in the return of the carriers to folded out-of-the-way position, the counterbalancing means facilitate this operation. The sheet metal bottoms 30 of the carriers have longitudinally extending channel side members 34 secured thereon providing convenient guides for the legs 35 of the stretchers in sliding the stretchers to and fro in loading and unloading, and these channels are of great advantage because once the front pair of legs on a stretcher have been entered in the channels the stretcher is guided from that point on, as the legs slide along the channels, and it therefore requires only one attendant to complete the loading of a stretcher after the front legs have been entered in the channels by other attendants. So much for a general description of the type of ambulance to which the ventilation system of my invention has been applied.

36 indicates a longitudinally extending air duct in the middle of the top 13 of the ambulance, which projects forwardly over the top of the driver's cab 24 and has an inlet grill 37 in the front end thereof for intake of fresh air in warm weather. The air passing through the grill 37 enters the duct 36 through a louvered opening 38 behind the grill, which can be opened or closed at will by an attendant inside the ambulance by operating a flap valve 39 pivoted at its upper end at 40 and pivotally connected at its lower end to a rod 41 which has a push and pull knob 42 on the rear end thereof, the rod extending rearwardly from the flap valve 39 over the top of the cab 24 and through an opening 43 into the upper front portion of the ambulance, where the knob 42 is easily accessible to either of the attendants seated in the seats 26. Notches 44 and 45 are provided in the bottom of the rod 41 in longitudinally spaced relation to permit locking the flap valve 39 in an adjusted position by engagement of a locking plate 46 in either of these notches. The grilled front end 37 of the air duct 36 serves as a scoop to take in fresh air readily in the forward travel of the ambulance, and the top wall 47 of the cab 24 is conformed within the front end portion of the air duct 36 to provide upwardly inclined portions 48 and 49 to direct the incoming air upwardly over the transverse wall 50 through which the push and pull rod 41 extends, whereby to minimize the resistance to air flow in the duct and insure a flow of air at reasonably high velocity inside the duct lengthwise of the top of the stretcher or passenger space 51. There is an inner top wall or panel 52 in each of the recesses 29, the marginal portion of which extends across the bottom of the air duct 36, and each of these walls 52 has longitudinally spaced holes 53 provided therein so that air can be discharged downwardly into the space 51 readily from the duct 36. A partition 66 extends lengthwise of the middle of the duct 36 from a point behind the inclined end 49 of the top wall 47 of the cab, so as to define two passages 67 and 68 on opposite sides thereof for substantially even distribution of the incoming air to the two halves of the space 51. The partition 66 also separates the two recesses 29 in which the two carriers 12 are adapted to be housed. When the carriers 12 are in use, as indicated in the right hand portion of Fig. 2, air is discharged through the holes 53 directly into the space 51, but when the carriers are folded in out-of-the-way position, as shown in the left hand portion of Fig. 2, the air discharged through the holes 53 is caused to flow through other holes 54 provided in longitudinally spaced relation in the bottom 30 of the carrier. The air ultimately finds its way out through the rear opening 15 between, around, and under the doors 19. The general direction of the air flow is indicated by the arrows a. There is no sensation of draft with this kind of ventilation, due to the fact that there is no sudden inrush of air at any one point but instead a diffusion over the entire area of the top of the ambulance as the air seeps through the multiplicity of openings 53, or 53 and 54, as the case may be. There is no need for any blowers or suction fans to induce the circulation described, sufficient pressure being produced in the manner of pick-up on the one hand and there being a sufficient suction behind the ambulance in its forward travel to induce outflow of stale air through the rear opening 15 around, between, and under the doors 19.

In cold weather, the flap valve 39 is kept closed and fresh air is admitted by opening the conventional cowl ventilator 55. The air thus admitted can be circulated through or past the usual hot water or other type heater in the driver's cab 24, like that indicated at 56, and circulated rearwardly into the passenger or stretcher space 51. The motor driven fan 57 of the heater insures good circulation of the warm air. Under certain conditions, as, for example, where there is only one patient being carried on a stretcher, the seepage of air through the rear opening 15 around, between, and under the doors 19 will suffice to provide good ventilation. However, a damper or ventilator 58 is pivoted at 59 in the air duct 36 to serve as a closure for an opening 60 in the top wall of the air duct located adjacent the front end of the passenger and stretcher space 51. This damper opens upwardly and forwardly to the inclined position shown, whereby in the forward travel of the ambulance there is sufficient suction to exhaust foul air from the top of the space 51 through the openings 53, alone or through the openings 53 and 54, the foul air going through these openings being conducted through the duct 36 forwardly and out through the opening 60, where it is entrained with the air flowing past the top of the damper 58. The dotted line arrows b indicate the circulation of air from the point of entry at 55 to the point of exit at 60. The damper 58 has an arm 61 attached thereto and extending downwardly therefrom through the opening 60. A push and pull rod 62 is pivotally connected to the lower end of the arm 61 and extends through the opening 43 in the wall 50 in parallel relation to the rod 41 previously mentioned. A knob 63 is provided on the rear end of the rod, and there are two notches 64 and 65 in the rod on the lower side thereof for engagement of the locking plate 46 in either notch to hold the damper in opened or closed position.

It should be apparent from the foregoing description that I have provided a ventilation system for year around operation, which does not involve a complicated or expensive construction. Full advantage is taken of the air flow over the top of the ambulance to induce an ample supply of fresh air through the passenger space 51 in warm weather operation and also in cold weather operation, and full advantage is also taken of the suction created behind the vehicle in the movement thereof to exhaust stale air in warm weather operation and also at certain times in cold weather operation, although the damper 58 will usually be opened to insure proper exhausting of foul air in cold weather operation. Incidentally, in cold weather operation, the fact that air from the heater 56 is directed along the floor is an advantage, because it is well recognized that it is most important to keep the feet warm for best comfort in cold weather ventilation. The forced circulation of air downwardly along the floor avoids any danger of the incoming air at 55 taking a short cut rearwardly and upwardly through the openings 53 and 54 and out through the ventilator opening 60, without circulating around the feet of the driver and passengers.

It is believed the foregoing description conveys a good understanding of the objects and advantages of my invention. The appended claims have been drawn to cover all legitimate modifications and adaptations.

I claim:

1. In a motor vehicle ventilation system, the combination of a closed body having a driver's cab portion in open communication with the space therebehind and provided with a fixed windshield and containing a heater, a variably openable cowl ventilator on the front of the cab for adjustable intake of fresh air for circulation rearwardly through the cab into the body whereby such fresh air may be heated by the heater, a longitudinally extending air duct on the top of said body having communication with the inside of the body throughout a substantial portion of the length of the top thereof through a multiplicity of closely spaced openings provided therein substantially throughout the area thereof, the front end portion of said duct extending transversely over the top of the cab and ending in a scoop-like fresh air inlet, an exhaust opening in the front end portion of said duct in rearwardly spaced relation to said inlet, manually operable valve means for regulating or shutting off the inflow of air through said fresh air inlet, and an adjustable ventilating closure for said exhaust opening extending upwardly and rearwardly from the front edge of said exhaust opening for variably uncovering the exhaust opening for outflow of air, the closely spaced openings in said duct affording uniform ventilation of the body by downflow of fresh air therethrough when the inlet opening is opened and the exhaust opening is closed, and said closely spaced openings tending to promote uniform heat distribution in and ventilation of said body by upflow of heated air therethrough when the cowl ventilator is opened and the heater is in operation and the inlet opening is closed and the exhaust opening is opened.

2. In a motor vehicle ventilation system, the combination of a body having a top wall over the passenger space in said body, an air duct extending lengthwise with respect to said top and having a forward air inlet opening adapted to take in air from the stream of air flowing over the top of said body when the vehicle is moving forward, a perforated inner top wall for the vehicle through which air may be discharged from the air duct into the upper portion of the passenger space in said body, a manually adjustable shutter for the air inlet opening, said duct having an exhaust opening in its outer top wall at one of the ends thereof, and a manually adjustable damper for closing said exhaust opening, which in its open positions extends upwardly and rearwardly from the front edge of said exhaust opening into the stream of air flowing over the top of said body when the vehicle is moving forward, said damper being adapted to variably uncover the exhaust opening for outlet of air and being operable independently of said shutter.

3. In a motor vehicle ventilation system, the combination of a closed body, a longitudinally extending air duct on the top of said body having communication with the inside of the body throughout a substantial portion of the length of the top thereof through a multiplicity of closely spaced openings provided therein substantially throughout the area thereof, the front end portion of said duct ending in a scoop-like fresh air inlet portion extending transversely over the top of the cab, an exhaust opening in the front end portion of said duct over the cab and in rearwardly spaced relation to said inlet, manually operable valve means for regulating or shutting off the inflow of air through the inlet opening, and an adjustable ventilating closure for said exhaust opening extending upwardly and rearwardly from the front edge of said exhaust opening for variably uncovering the exhaust opening for outflow of air, the closely spaced openings in said duct affording uniform ventilation of the body by downflow of fresh air therethrough when the inlet opening is opened and the exhaust opening is closed, and said closely spaced openings tending to promote ventilation of said body by upflow of air therethrough when the inlet opening is closed and the exhaust opening is opened.

EARL L. SCHOFIELD.